United States Patent
Lee et al.

(10) Patent No.: US 9,281,013 B2
(45) Date of Patent: Mar. 8, 2016

(54) SYSTEMS AND METHODS FOR TRANSMISSION OF MEDIA CONTENT

(75) Inventors: Hsieh-Te Lee, Taoyuan County (TW); Ming-Kai Hsieh, New Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 247 days.

(21) Appl. No.: 13/302,252

(22) Filed: Nov. 22, 2011

(65) Prior Publication Data

US 2013/0129303 A1    May 23, 2013

(51) Int. Cl.
| | |
|---|---|
| H04N 5/932 | (2006.01) |
| H04N 5/935 | (2006.01) |
| H04N 5/931 | (2006.01) |
| G11B 27/10 | (2006.01) |
| H04N 21/43 | (2011.01) |
| G11B 27/30 | (2006.01) |
| H04N 21/41 | (2011.01) |
| H04N 21/414 | (2011.01) |
| H04N 21/439 | (2011.01) |

(52) U.S. Cl.
CPC ............ *G11B 27/10* (2013.01); *G11B 27/3036* (2013.01); *H04N 21/4126* (2013.01); *H04N 21/41407* (2013.01); *H04N 21/4307* (2013.01); *H04N 21/439* (2013.01)

(58) Field of Classification Search
USPC .......................... 386/201–203, 207, 215–216
See application file for complete search history.

(56) References Cited

U.S. PATENT DOCUMENTS

| | | | |
|---|---|---|---|
| 2002/0072326 A1 | 6/2002 | Qureshey et al. | |
| 2002/0078447 A1 | 6/2002 | Mizutome et al. | |
| 2002/0122137 A1 | 9/2002 | Chen et al. | |
| 2002/0178277 A1 | 11/2002 | Laksono | |
| 2004/0014426 A1 | 1/2004 | Moore | |
| 2004/0117645 A1 | 6/2004 | Okuda et al. | |
| 2004/0157555 A1 | 8/2004 | Richenstein et al. | |
| 2005/0025465 A1 | 2/2005 | Danieli | |
| 2005/0149973 A1 | 7/2005 | Fang | |
| 2005/0286497 A1 | 12/2005 | Zutaut et al. | |
| 2006/0026271 A1 | 2/2006 | Julia et al. | |
| 2006/0135080 A1* | 6/2006 | Khandekar | H04L 1/0001 455/69 |
| 2007/0087686 A1 | 4/2007 | Holm et al. | |
| 2007/0274685 A1* | 11/2007 | Hale et al. ...................... 386/97 |

(Continued)

OTHER PUBLICATIONS

Instruction manual for Medion DVD Player MD 40814.
(Continued)

*Primary Examiner* — Nigar Chowdhury
(74) *Attorney, Agent, or Firm* — McClure, Qualey & Rodack, LLP (57) ABSTRACT

A method provide a selection option to the at least one portable device, the selection option relating to selection of the first audio content and retrieving a selection from the at least one portable device based on the selection option. The method further retrieves a selection of the second audio content and synchronizing the first audio content, the second audio content, and the video content by embedding a synchronizing signal in the first audio content, the second audio content, and the video content. The method further outputs the second audio content and the video content to an output device according to the synchronizing signal. Responsive to the selection of the first audio content, the first audio content with the embedded synchronizing signal is transmitted to the least one portable device, wherein the at least one portable device outputs the first audio content according to the synchronizing signal.

18 Claims, 8 Drawing Sheets

(56) References Cited

U.S. PATENT DOCUMENTS

| | | | |
|---|---|---|---|
| 2008/0005676 A1 | 1/2008 | Evans et al. | |
| 2009/0091655 A1* | 4/2009 | Russell et al. | 348/515 |
| 2009/0287324 A1 | 11/2009 | Too | |
| 2009/0304214 A1 | 12/2009 | Xiang et al. | |
| 2010/0027613 A1 | 2/2010 | Zimmerman et al. | |
| 2010/0278517 A1* | 11/2010 | Sakata et al. | 386/357 |
| 2012/0004900 A1* | 1/2012 | Chen et al. | 704/8 |

OTHER PUBLICATIONS

Marco Lohse et al. "Dynamic Distributed Multimedia: Seamless Sharing and Reconfiguration of Multimedia Flow Graphs." Proceedings of the 2nd International Conference on Mobile and Ubiquitous Multimedia, 2003. pp. 89-95.

User manual for Samsung LED TV Series 6000.

User manual for Samsung Blu-ray Disc Player BD-C7500.

VIA EPIA Main Board Powers 'Macrosystem' 'Enterprise' Advanced Home Entertainment System. Printout from archieved Web page, published 2005.

* cited by examiner

SYSTEMS AND METHODS FOR TRANSMISSION OF MEDIA CONTENT

BACKGROUND

One of the appealing features of DVDs and other formats such as BLU-RAY Disc® and HD DVD® (High Definition Digital Video Disc) is the interactive menus that allow viewers, for example, to select a particular language for closed captioning or for the audio track. People enjoy gathering together to watch movies and other programs. In some cases, one or more individuals within a group may wish to listen to the audio track in a particular language. However, while different audio tracks may be available on a DVD, for example, all the viewers are limited to listening to the same audio track.

SUMMARY

Briefly described, one embodiment, among others, is a method for dynamically playing back media content on a media playback device and at least one portable device, wherein the media content comprises only one video content and at least two audio content. The method comprises providing a selection option to the at least one portable device, the selection option relating to selection of the first audio content and retrieving a selection from the at least one portable device based on the selection option. The method further comprises retrieving a selection of the second audio content and synchronizing the first audio content, the second audio content, and the video content by embedding a synchronizing signal in the first audio content, the second audio content, and the video content. The method further comprises outputting the second audio content and the video content to an output device according to the synchronizing signal. Responsive to the selection of the first audio content, the first audio content with the embedded synchronizing signal is transmitted to the least one portable device, wherein the at least one portable device outputs the first audio content according to the synchronizing signal.

Another embodiment is a non-transitory computer-readable medium embodying at least one program executable in a media playback device. The at least one program comprises code that provides a selection option to at least one portable device, the selection option relating to a first audio content, code that retrieves a language selection from the media playback device based on the selection option, and code that embeds a synchronizing signal in the first audio content, a second audio content, and a video content to synchronize the first audio content, the second audio content, and the video content. The at least one program further comprises code that transmits the first audio content to the at least one portable device according to the language selection and according to the synchronizing signal and code that outputs the second audio content and the video content to an output device according to the synchronizing signal.

Another embodiment is a system that comprises a media playback device for performing playback of media content and an application executable in the media playback device. The application comprises logic that provides a selection option to at least one portable device, logic that retrieves a language selection from the at least one portable device based on the selection option, logic that embeds a synchronizing signal in a first audio content, a second audio content and a video content of the media content, logic that transmits the first audio content to the at least one portable device according to the language selection and according to the synchronizing signal, and logic that transmits the second audio content of the media content and the video content of the media content to an output device coupled to the media playback device according to the synchronizing signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

The present disclosure relates to various embodiments for transmitting media content such that viewers watching a video can listen to the audio portion in different languages. As an example, one viewer may wish to view the video while listening to the audio portion in English, while another viewer may wish to view the same video while listening to the audio portion in Chinese. This is not possible for viewers sitting together and watching a video being played on a media player as the audio content is being played on only one output device (e.g., a set of speakers).

Various embodiments of the present disclosure facilitate the playback of media content whereby different viewers are able to listen to the audio portion of the media content in a language of choice. For some embodiments, a media playback device provides a selection option to at least one portable device associated with at least one viewer, where the selection option relates to a language selection. The media playback device retrieves a selection from the at least one portable device based on the selection option.

Based on the language selection, the media playback device transmits a first media content to the at least one portable device. At the same time, a second and third media content is sent to an output device comprising a set of speakers or other device(s). For some embodiments, the first and second media content comprise audio content, and the third media content corresponds to a video portion. Notably, the first, second, and third media content are aligned and output in a synchronized fashion so that all the viewers can enjoy the content of the media content together at the same time while listening to different audio tracks. A description of a system for transmitting media content is now described followed by a discussion of the operation of the components within the system.

Figure 1:
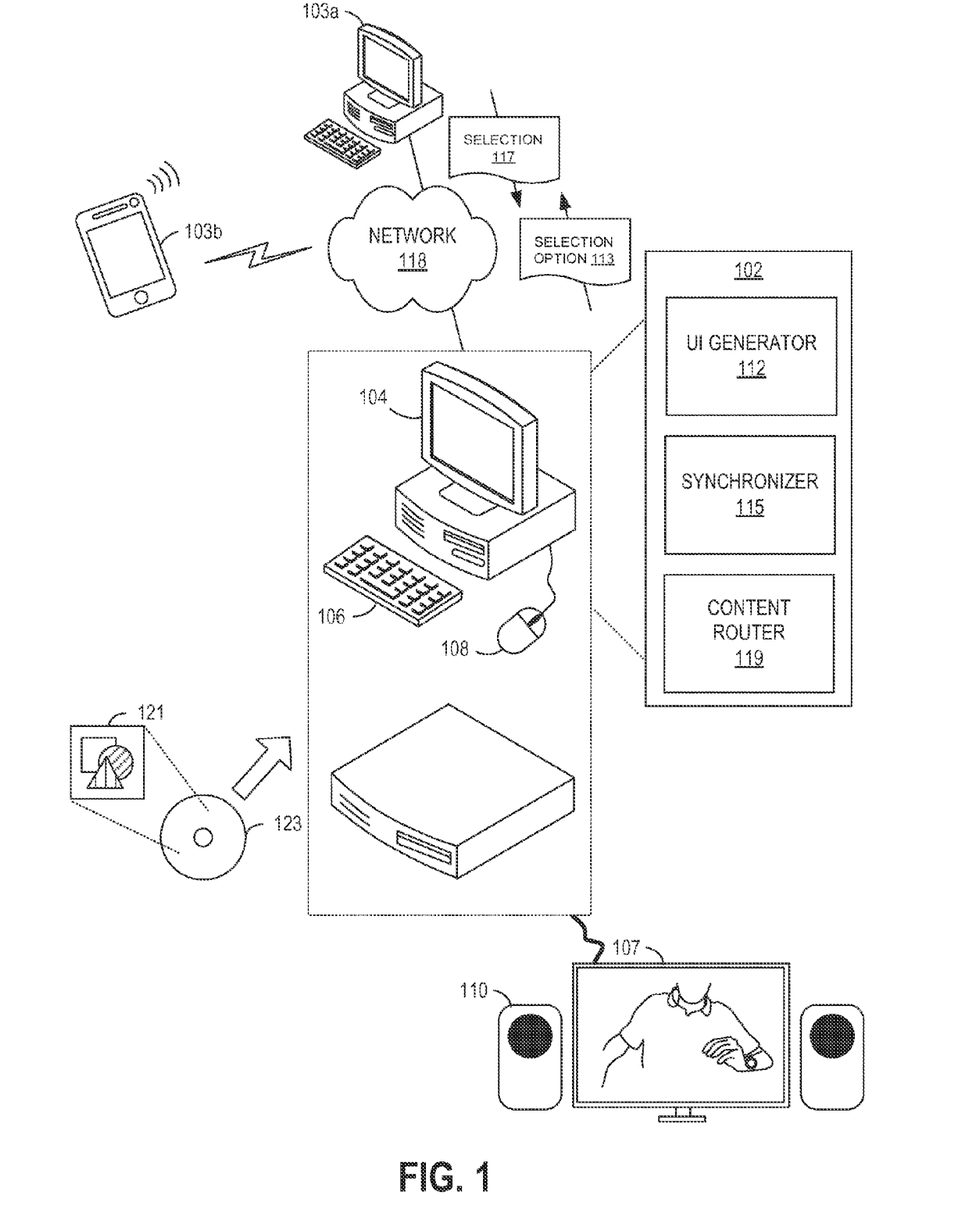
FIG. 1 is a block diagram of a networked environment in which embodiments of a media playback device may be implemented.

FIG. 1 is a block diagram of a networked environment in which embodiments of a media playback device 102 may be implemented. The media playback device 102 may be embodied, for example, as a desktop computer, computer workstation, laptop, or other computing platform. In other embodiments, the media playback device 102 may be embodied as a video gaming console (not shown), which includes a video game controller for receiving user preferences. For such embodiments, the video gaming console may be connected to a television (not shown) or other display.

The media playback device 102 may include a display 104 and input devices such as a keyboard 106 and a mouse 108. The media playback device 102 is configured to receive media content 121 from various sources. For some implementations, the media content 121 is retrieved from a storage medium 123 such as, for example, an optical disc (e.g., a DVD, BD), or other tangible storage medium. As one of ordinary skill will appreciate, the media content 121 may be encoded in various formats.

For some embodiments, the media playback device 102 comprises a user interface (UI) generator 112, a synchronizer 115, and a content router 119. The UI generator 112 is configured to transmit a selection option 113 to one or more portable devices, where the selection option 113 may be embodied as a web page or other form of electronic communication. The selection option 113 is rendered locally on the portable device(s) 103a, 103b receiving the selection option. As described in more detail below, the selection option 113 may correspond, for example, to one or more languages from which the user of the portable device may select from. The UI generator 112 is further configured to receive one or more selections 117 in response to the selection option 113, where the selection 117 may correspond, for example, to the selection of one or more languages.

The media playback device 102 may be coupled to the one or more portable devices 103a, 103b via a network 118. The network 118 includes, for example, the Internet, intranets, extranets, wide area networks (WANs), local area networks (LANs), wired networks, wireless networks, or other suitable networks, etc., or any combination of two or more such networks. Through the network 118, the media playback device 102 is in data connection with one or more portable devices 103a, 103b, which may comprise a smartphone, tablet, or other mobile computing device.

The synchronizer 115 in the media playback device 102 is configured to synchronize one or more audio content with video content, where the audio content and video content are portions of media content 121 being played on the media playback device 102. As described in more detail below, the synchronizer 115 performs synchronization among one or more audio content and a video content, wherein synchronization is performed based on synchronization between a system clock in the media playback device 102 and corresponding clocks on the one or more portable devices 103a, 103b in data communication with the media playback device 102. Synchronization is further based on a time code adjustment operation involving video frames and audio samples, as described in more detail below.

The content router 119 is configured to route the one or more audio content and video content to one or more output device(s). As shown in FIG. 1, media playback device 102 may also be coupled to one or more portable devices 103a, 103b. As described in more detail below, the content router 119 comprises a video decoder and one or more audio decoders. The video decoder decodes video content from the media content 121 read from a storage medium 123 (e.g., a DVD) and passes the decoded video content to a video renderer in the content router 119. The content router 119 may comprise multiple audio decoders from decoding audio content from the media content 121 where one audio content may correspond to a first language and a second audio content corresponds to a second language. As described in more detail below, the video content, first audio content, and second audio content may be output to different destinations (e.g., output device, portable device).

Figure 2:
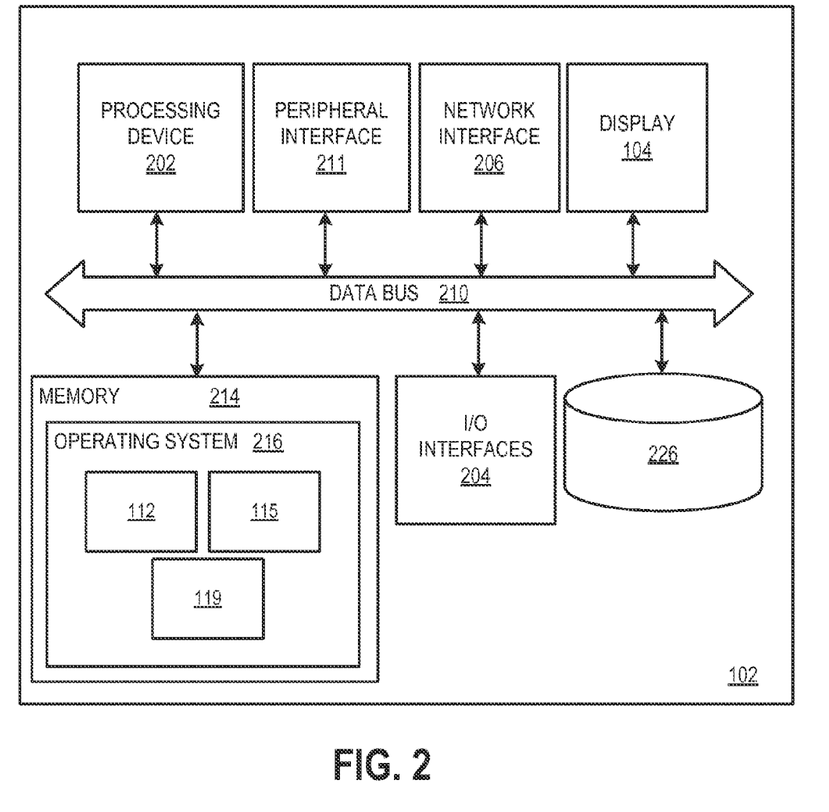
FIG. 2 is a schematic of the media playback device shown in FIG. 1.

FIG. 2 is a schematic of the media playback device 102 shown in FIG. 1. The media playback device 102 may be embodied in any one of a wide variety of wired and/or wireless computing devices, such as a desktop computer, portable computer, dedicated server computer, multiprocessor computing device, and so forth. As shown in FIG. 2, the media playback device 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the media playback device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components 112, 115, 119 of the media playback device 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the media playback device 102 comprises a personal computer, these components may interface with one or more user input devices 204, which may comprise a keyboard 106 or a mouse 108, as shown in FIG. 1. The display 104 may comprise a computer monitor, a plasma screen for a PC, a liquid crystal display (LCD) on a hand held device, or other display device.

In the context of this disclosure, a computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The media playback device 102 may communicate with one or more portable devices 103a, 103b (FIG. 1) via the network interface 206 over the network 118 (FIG. 1). The media playback device 102 may further comprise mass storage 226. The peripheral 211 interface supports various interfaces including, but not limited to IEEE-1394 High Performance Serial Bus (Firewire), USB, a serial connection, and a parallel connection.

Figure 3:
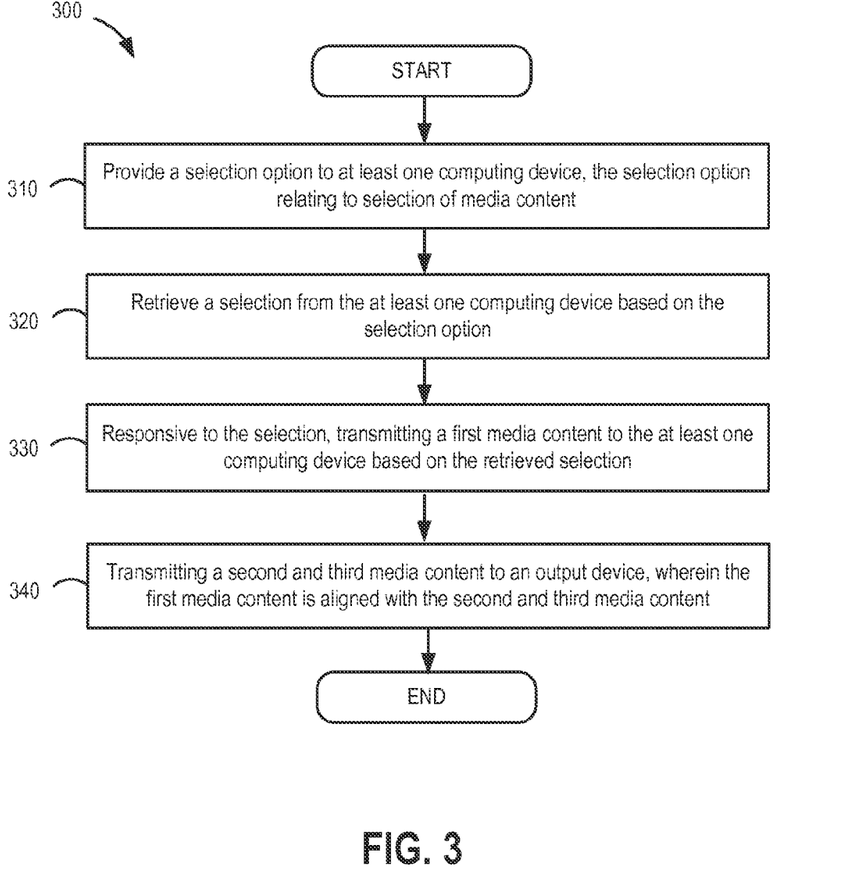
FIG. 3 is a flowchart in accordance with one embodiment for transmitting media content.

Reference is made to FIG. 3, which is a flowchart 300 in accordance with one embodiment for transmitting media content. It is understood that the flowchart of FIG. 3 provides merely an example of the many different types of functional arrangements that may be employed to implement the operation of the media playback device 102 (FIG. 1) as described herein. As an alternative, the flowchart of FIG. 3 may be viewed as depicting an example of steps of a method implemented in the media playback device 102 according to one or more embodiments.

Beginning with box 310, the media playback device 102 provides a selection option to at least one portable device 103a, 103b (FIG. 1), the selection option relating to selection of media content. In box 320, the media playback device 102 retrieves a selection from the at least one portable device 103a, 103b based on the selection option. In box 330, if the selection of the portable device is a first audio content, the first media content is transmitted to the at least one portable device 103a, 103b based on the retrieved selection.

In box 340, a second audio content and video content are transmitted to an output device of the media playback device 102, wherein the first audio content is aligned with the second audio content and the video content. Referring back briefly to FIG. 1, the output device may comprise, for example, a display 107 and/or the speakers 110 shown. The display 107 may comprise, for example, one or more devices such as cathode ray tubes (CRTs), liquid crystal display (LCD) screens, gas plasma-based flat panel displays, LCD projectors, or other types of display devices, etc. Note that the output device may refer to any device that is capable of both displaying video content and outputting audio content (e.g., a flat panel display with integrated speakers). Thereafter, the flowchart 300 ends as shown.

Figure 4:
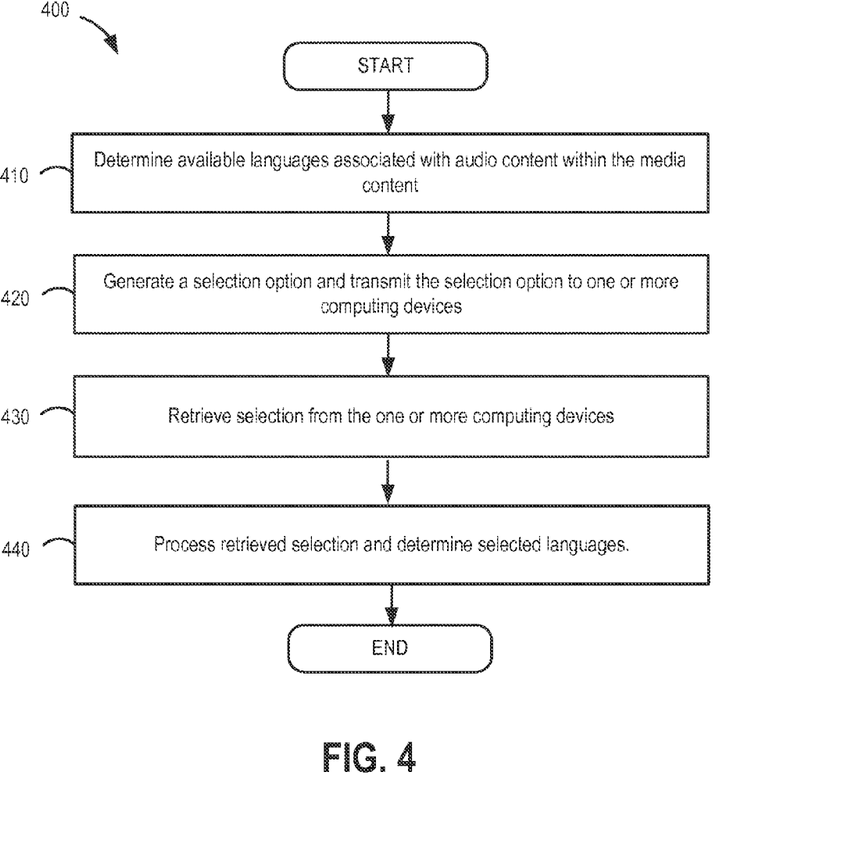
FIG. 4 is flowchart that provides one example of the operation of the UI generator in the media playback device of FIG. 1 according to various embodiments.

Reference is made to FIG. 4, which is a flowchart 400 that provides one example of the operation of the UI generator 112 (FIG. 1) in the media playback device 102 (FIG. 1) according to various embodiments. It is understood that the flowchart of FIG. 4 provides merely an example of the many different types of functional arrangements that may be employed to implement the operation of the UI generator 112 as described herein. As an alternative, the flowchart of FIG. 4 may be viewed as depicting an example of steps of a method implemented in the media playback device 102 according to one or more embodiments.

Beginning with box 410, the UI generator 112 determines what languages are available with respect to the media content 121 (FIG. 1) read by the media playback device 102 from the storage medium 123 (FIG. 1). The UI generator 112 may perform this function, for example, by reading the language codes from the storage medium 123 (e.g., DVD, BD), where the language codes specify languages associated with DVD menus, audio content, and so on. The language codes may indicate, for example, that the audio content is available in English, Chinese, and French.

In box 420, the UI generator 112 generates a selection option 113 (FIG. 1) in the form of an electronic communication to be sent to the one or more portable devices 103a, 103b (FIG. 1). As a nonlimiting example, the selection page 113 may be embodied as a web page that is rendered on the display of the portable device 103a, 103b, where the user of each device is able to interactively make a selection 117 (FIG. 1). In box 430, the selection 117 is retrieved by the media playback device 102, and in box 440, the UI generator 112 processes the retrieved selection 117 and determines the languages selected by the user(s) of the portable device 103a, 103b. Thereafter, the flowchart 400 ends as shown.

Figure 5:
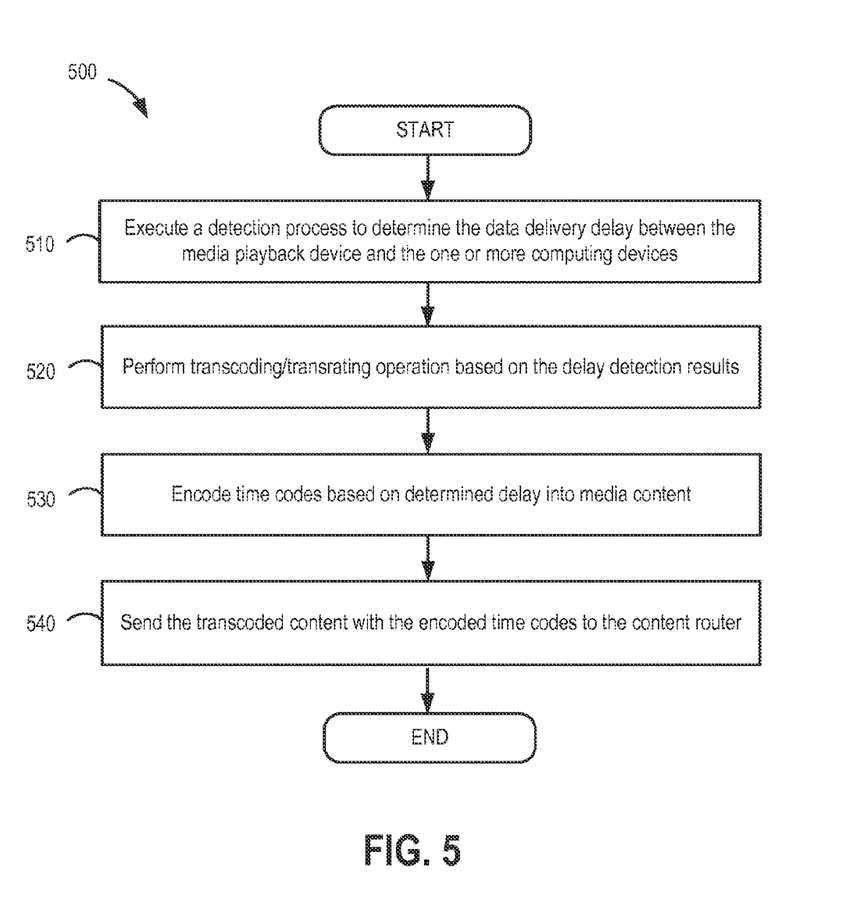
FIG. 5 is flowchart that provides one example of the operation of the synchronizer in the media playback device of FIG. 1 according to various embodiments.

Reference is made to FIG. 5, which is a flowchart 500 that provides one example of the operation of the synchronizer 115 (FIG. 1) in the media playback device 102 (FIG. 1) according to various embodiments. It is understood that the flowchart of FIG. 5 provides merely an example of the many different types of functional arrangements that may be employed to implement the operation of the synchronizer 115 as described herein. As an alternative, the flowchart of FIG. 5 may be viewed as depicting an example of steps of a method implemented in the media playback device 102 according to one or more embodiments.

Beginning with box 510, the synchronizer 115 executes a detection process to determine the data delivery delay between the media playback device 102 and the one or more portable devices 103a, 103b (FIG. 1). For some embodiments, this is accomplished by transmitting a test sequence of data from the media playback device 102 to the portable device(s) 103a, 103b and receiving the test sequence back from the portable device(s) 103a, 103b. Based on this, the data delivery speed can be calculated to determine the data delivery delay between the media playback device 102 and each of the portable devices 103a, 103b. For some embodiments, this delay detection process may be performed during a calibration phase that takes place between the media playback device 102 and the portable devices 103a, 103b.

In box 520, a transcoding or transrating operation is performed based on the delay detection results in order to adjust the data rate of the audio content which will be sent to the portable devices 103a, 103b. Transcoding/transrating is also performed based on the selection 117 (FIG. 1) retrieved by the media playback device 102. To illustrate, if the selection 117 specifies Spanish as the selected language, the synchronizer 115 retrieves audio content encoded in the Spanish language from the media content 121 (FIG. 1) stored on the storage medium 123 (FIG. 1). The audio content in Spanish will later be transmitted to one or more of the portable devices 130*a*, 103*b* so that users of the one or more portable devices 130*a*, 103*b* can view the video content while listening to the audio content in the selected language.

The transcoding/transrating is performed based on the delay detection results to ensure that the audio content is synchronized with respect to other content (e.g., second audio content, video content) being sent to other destinations (e.g., output device). Note that if a transcoding or transrating operation is performed, the delay detection process may also take into account the required computation time for the transcoding or transrating operation in order to compensate for this additional source of delay.

In box 530, adjusted time codes are encoded into the audio content to be sent to the portable devices 103*a*, 103*b*, where the adjusted time codes are derived based on the determined delay. As described above, the determined delay may take into account the data delivery delay as well as delay caused by the transcoding/transrating operation. In box 540, the transcoded content with the adjusted time codes is sent to the content router 119 (FIG. 1) for further processing. Thereafter, the flowchart 500 ends as shown.

Figure 6:
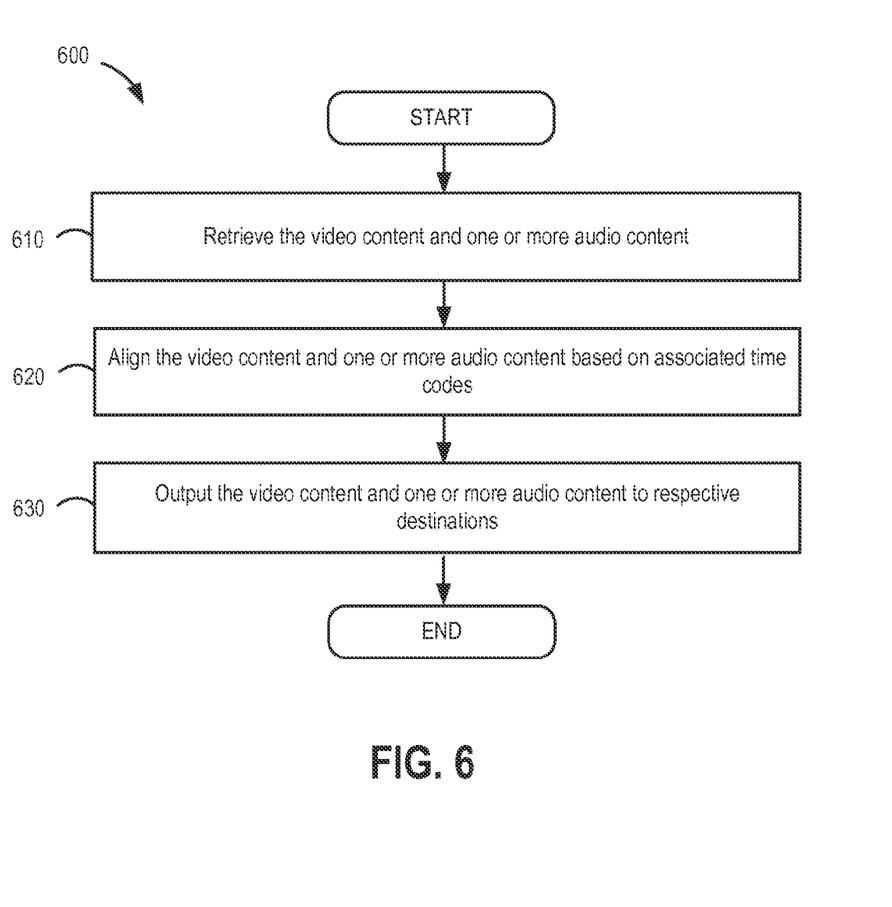
FIG. 6 is flowchart that provides one example of the operation of the router in the media playback device of FIG. 1 according to various embodiments.

Reference is made to FIG. 6, which is a flowchart 600 that provides one example of the operation of the content router 119 (FIG. 1) in the media playback device 102 (FIG. 1) according to various embodiments. It is understood that the flowchart of FIG. 6 provides merely an example of the many different types of functional arrangements that may be employed to implement the operation of the content router 119 as described herein. As an alternative, the flowchart of FIG. 6 may be viewed as depicting an example of steps of a method implemented in the media playback device 102 according to one or more embodiments.

In box 610, the content router 119 retrieves the video content and one or more audio content. As a nonlimiting example, the content router 119 may retrieve the video content, a first audio content encoded in English, and a second audio content encoded in a different language such as Chinese.

In box 620, the content router 119 prepares to output the video content, the first audio content, and the second audio content to be output to different destinations by aligning the video content, the first audio content, and the second audio content based on associated time codes.

In box 630, once aligned, the video content, the first audio content, and the second audio content are output to their respective destinations by the content router 119. The content router 119 may, for example, output the video content and the first audio content to an output device coupled to the media playback device 102 and output the second audio content to one or more portable devices 103*a*, 103*b*.

As part of the alignment process, a video renderer in the content router 119 transmits the video content in the media content 121 (FIG. 1) to an output device such as a display 107 (FIG. 1) according to the encoded time codes associated with the video frames and according to the system clock of the media playback device 102. When the time code of a specific video frame matches the current system time clock of the media playback device 102, that video frame is sent to the video display 107 by the video renderer. When the time code of a specific video frame is different from the current time clock but will later align with the time clock of the media playback device 102, the video frame is temporarily queued in an internal buffer of the content router 119 until the time to transmit the video frame is reached.

A first audio decoder in the content router 119 decodes the first audio content and transmits the decoded first audio content to the first audio renderer. The first audio renderer then transmits the first audio content to the output device (e.g., a set of speakers 110 (FIG. 1)) when the time codes of the first audio content matches the system time clock of the media playback device 102. Otherwise, the first audio content is temporarily queued in the internal buffer of the audio renderer until the appropriate time to transmit the first audio content. Note that the video content and the first audio content may be transmitted to the same device (i.e., an output device). In the nonlimiting example in FIG. 1, the display 107 and the speakers 110 may be coupled together.

The second audio decoder is typically implemented in the portable device(s) 103*a*, 103*b* receiving the second audio content and receives the second audio content later than the first audio decoder receives the first audio content due to delivery delay caused by the network conditions and/or due to the transcoding/transrating processing involving the first and second audio content. However, because the time codes of the second audio content is modified according to the data delivery delay determined by the synchronizer 115 (FIG. 1), the second audio content received by the second audio decoder in the portable device(s) 103*a*, 103*b* is aligned with the first audio content received by the first audio decoder in the media playback device 102.

The second audio decoder decodes the second audio content and delivers the decoded second audio content to a second audio renderer in the portable device 103*a*, 103*b*. The second audio renderer outputs the second audio content according to the modified time codes of the second audio content and the system time clock of the media playback device 102. As described above, the second audio content is output via one or more portable devices 103*a*, 103*b* so that the user(s) receives the audio content in a different language from that of the first audio content. In accordance with exemplary embodiments, the video renderer, the first audio renderer, and second audio renderer output their respective content such that the video content aligns with the first and second audio content. Specifically, the video renderer, the first audio renderer, and the second audio renderer output the video content, the first audio content, and the second audio content at the same time based on the calibrated system time clock of the media playback device 102 and the one or more portable devices 103*a*, 103*b* and based on the adjustment of the time codes of the video content, the first audio content, and the second audio content according to the data delivery delay between the media playback device 102 and the one or more portable devices 103*a*, 103*b*. The synchronization mechanism comprises two parts: (1) a calibration operation involving the system time clocks of the media playback device (which may be embodied, for example, as a PC) and the portable device 103*a*, 103*b*; and (2) a time code adjustment operation involving the video frames and audio samples.

Calibration is performed on the system time clocks of the media playback device and the portable device to ensure that both the media playback device 102 and the portable device(s) 103*a*, 103*b* operate according to a common time clock which serves as the time scheduling base for rendering video frames and audio samples. Because there will be a delay during the audio sample delivery process between the media playback device 102 and the portable device(s) 103*a*, 103*b* through the network, a time code adjustment operation is performed to mitigate this delay, thereby avoiding synchronization issues involving the audio/video content. Thereafter, the flowchart 600 ends as shown.

Figure 7:
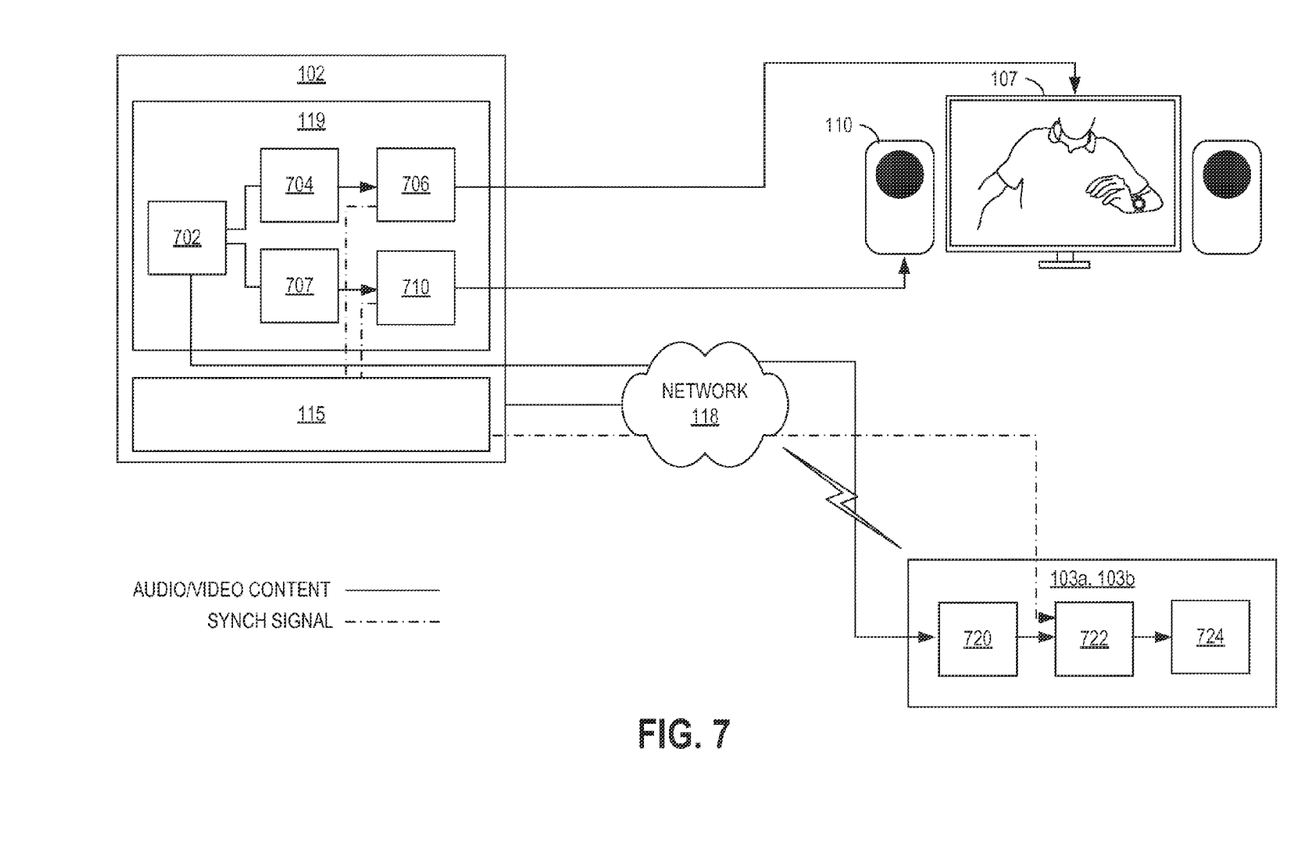
FIG. 7 is a schematic diagram of the synchronizer and content router and illustrates the signal flow between the various components in accordance with the process described above in connection with FIG. 6.

Reference is made to FIG. 7, which is a schematic diagram of the synchronizer 115 (FIG. 1) and content router 119 (FIG. 1). FIG. 7 further illustrates the signal flow between the various components in accordance with the process described above in connection with FIG. 6. The BD/DVD demultiplexer 702 performs a read-ahead operation in order to retrieve the audio/video muxed data from the storage medium 123 in advance according to the data delivery delay determined by a detection mechanism. A demultiplexer 702 in the content router 119 reads the video and audio content off the storage medium 123 (FIG. 1) and splits the video content, the first audio content, and the second audio content from the media content 121 (FIG. 1) and modifies the time codes of the video content, the first audio content, and the second audio content by adding a suitable value derived from the content delivery delay determined by the synchronizer 115, as described earlier. After modification of the time code, the demultiplexer 702 sends the video content and the first audio content to the video decoder 704 and audio decoder 706 and sends the second audio content through the network 118 to the portable device(s) 103a, 103b.

A video decoder 704 in the media playback device 102 (FIG. 1) decodes the video content and passes the decoded video frames to the video renderer 708. The video renderer 708 outputs the video content to an output device such as a video display 107 according to the modified time codes associated with the video frames and the system clock of the media playback device 102. The system clock may be conveyed in the form of a synchronization signal, as shown in FIG. 7.

The first audio decoder 707 in the media playback device 102 outputs the audio content to the audio renderer 710, which outputs the first audio content to a set of speakers 110 (FIG. 1) or other output device according to the corresponding time codes of the first audio content and according to the system time clock of the media playback device 102.

The second audio decoder 720 is found on the portable device 103a, 103b receiving the second audio content. Typically, the second audio content is received by the portable device 103a, 103b later than the first audio decoder 707 receives the first audio content due to delay in delivering the second audio content over the network 118 and due to delay caused by transcoding/transrating of the second audio content. However, as the time codes of the second audio content has been modified according to the content delivery delay determined by the detection mechanism, the second audio content received by the second audio decoder 720 is aligned with the video content and first audio content.

The second audio decoder 720 decodes the second audio content and delivers the decoded second audio content to the second audio renderer 722 on the portable device 103a, 103b, which then outputs the second audio content according to the modified time codes of the second audio content and the system time clock of the media playback device 102. The second audio renderer 722 outputs the second audio content to an audio port 724.

Figure 8:
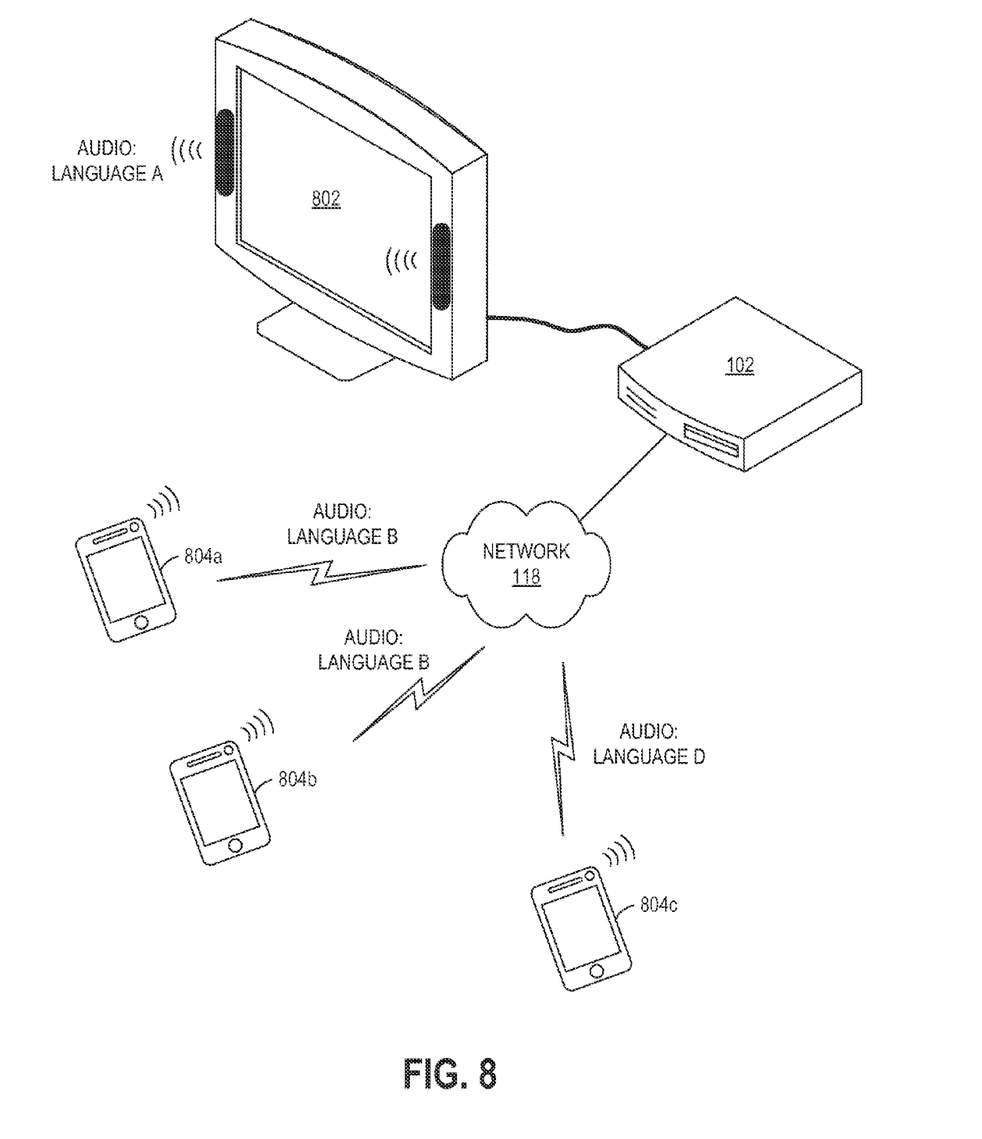
FIG. 8 depicts an example configuration whereby audio content in multiple languages is transmitted to various destinations.

Reference is made to FIG. 8, which depicts an example configuration whereby audio content in multiple languages is transmitted to various destinations. As shown, the media playback device 102 is coupled to an output device 802. In this illustration, the output device 802 is capable of displaying video content and outputting audio content. The media playback device 102 is wirelessly coupled to various portable devices 804a, 804b, 804c via the network 118, where each of the portable devices 804a, 804b, 804c receives audio content in a different language. The users of the portable devices 804a, 804b, 804c may listen to the audio content received on their respective portable devices 804a, 804b, 804c via earphones or other device coupled to the portable devices 804a, 804b, 804c.

The flowcharts of FIGS. 3-6 show the functionality and operation of an implementation of the media playback device 102 (FIG. 1). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the UI generator 112, synchronizer 115, and the content router 119 that comprises software or code can be embodied in any non-transitory computer-readable medium for use by or in connection with an instruction execution system such as, for example, a processing device 202 (FIG. 2) in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments are merely examples of possible implementations. Many variations and modifications may be made to the above- At least the following is claimed:

1. A method for dynamically playing back media content on a media playback device and at least one portable device, wherein the media content comprises only one video content and at least two audio content, comprising:
   providing, by the media playback device, a selection option to the at least one portable device, the selection option relating to selection of the first audio content;
   retrieving, by the media playback device, a selection from the at least one portable device based on the selection option;
   retrieving, by the media playback device, a selection of the second audio content;
   splitting, by the media playback device, the media content into the video content, the first audio content, and the second audio content;
   determining a time adjustment value corresponding to a data delivery time for transmitting the media content from the media playback device to the at least one portable device, wherein the data delivery time is caused by one of transcoding and transrating of the first and second audio content;
   adjusting time codes of each of the video content, the first audio content, and the second audio content according to the time adjustment value;
   encoding the respective adjusted time codes in each of the first audio content, the second audio content, and the video content;
   synchronizing the first audio content, the second audio content, and the video content by aligning the encoded time codes of the first audio content, the second audio content, and the video content;
   upon aligning the encoded time codes, outputting the second audio content and the video content to an output device;
   responsive to the selection of the first audio content, transmitting the first audio content to the least one portable device, wherein the at least one portable device outputs the first audio content according to the aligned adjusted time codes.

2. The method of claim 1, wherein synchronizing comprises:
   responsive to the determined data delivery time, adjusting data rates for transmitting the first audio content and for outputting the second audio content, and the video content.

3. The method of claim 2, wherein synchronizing further comprises determining a respective delay associated with transcoding the first audio content, the second audio content, and the video content, wherein adjusting data rates is further adjusted based on the respective delays.

4. The method of claim 1, wherein the first audio content corresponds to a first language and the second audio content corresponds to a second language.

5. The method of claim 4, wherein the selection option provided to the at least one portable device comprises a selection option relating to at least two languages.

6. The method of claim 4, wherein the second audio content is a translation of the first audio content.

7. The method of claim 1, wherein the output device comprises at least one speaker.

8. The method of claim 7, wherein the output device further comprises a display device coupled to the at least one speaker.

9. The method of claim 8, wherein the first audio content is output by the at least one portable device.

10. The method of claim 9, wherein the first audio content is output to one of: at least one speaker on the at least one portable device and an audio port on the at least one portable device.

11. A non-transitory computer-readable medium embodying at least one program executable in a media playback device for performing playback of media content comprising a video content, a first audio content, and a second audio content, the at least one program comprising:
   code that provides a selection option to at least one portable device, the selection option relating to the first audio content;
   code that retrieves a language selection from the media playback device based on the selection option;
   code that splits the media content into the video content, the first audio content, and the second audio content;
   code that determines a time adjustment value corresponding to a data delivery time for transmitting the media content from the media playback device to the at least one portable device, wherein the data delivery time is caused by one of transcoding and transrating of the first and second audio content;
   code that adjusts time codes of each of the video content, the first audio content, and the second audio content according to the time adjustment value;
   code that encodes the respective adjusted time codes in each of the first audio content, the second audio content, and the video content;
   code that aligns the encoded time codes of the first audio content, the second audio content, and the video content to synchronize the first audio content, the second audio content, and the video content;
   code that transmits the first audio content to the at least one portable device according to the language selection; and
   code that outputs the second audio content and the video content to an output device according to the aligned adjusted time codes.

12. The non-transitory computer-readable medium of claim 11, wherein the second audio content is associated with the language selection from the media playback device.

13. A system, comprising:
   a media playback device for performing playback of media content comprising a video content, a first audio content, and a second audio content; and
   an application executable in the media playback device, the application comprising:
      logic that provides a selection option to at least one portable device;
      logic that retrieves a language selection from the at least one portable device based on the selection option;
      logic that splits the media content into the video content, the first audio content, and the second audio content;
      logic that determines a time adjustment value corresponding to a data delivery time for transmitting the media content from the media playback device to the at least one portable device, wherein the data delivery time is caused by one of transcoding and transrating of the first and second audio content;
      logic that adjusts time codes of each of the video content, the first audio content, and the second audio content according to the time adjustment value;
      logic that encodes the respective adjusted time codes in each of the first audio content, the second audio content, and the video content;

logic that synchronizes the first audio content, the second audio content, and the video content by aligning the encoded time codes of the first audio content, the second audio content, and the video content;

logic that transmits the first audio content to the at least one portable device according to the language selection; and logic that transmits the second audio content of the media content and the video content of the media content to an output device coupled to the media playback device according to the aligned adjusted time codes.

14. The system of claim 13, wherein the selection option relates to a plurality of languages in which audio content of the media content is encoded in.

15. The system of claim 13, wherein the time adjustment value further corresponds to a processing time of the media content by the media playback device.

16. The system of claim 15, wherein the processing time relates at least in part on transcoding of the media content.

17. The system of claim 13, wherein a language corresponding to the language selection for the first audio content is different from a language corresponding to the second audio content.

18. The system of claim 13, further comprising logic that calibrates system time clocks corresponding to the at least one portable device and the output device.

* * * * *